United States Patent [19]

Tessler

[11] 4,020,272

[45] Apr. 26, 1977

[54] PREPARATION OF STARCH ESTERS

[75] Inventor: Martin M. Tessler, Edison, N.J.

[73] Assignee: National Starch and Chemical Corporation, Bridgewater, N.J.

[22] Filed: Dec. 22, 1975

[21] Appl. No.: 643,321

[52] U.S. Cl. .............................. 536/107; 536/110
[51] Int. Cl.$^2$ ....................................... C08B 31/02
[58] Field of Search ......................... 536/107, 110

[56] References Cited

UNITED STATES PATENTS 3,720,663  3/1973  Tessler .................. 260/233.5

*Primary Examiner*—Melvyn I. Marquis
*Attorney, Agent, or Firm*—Edwin Szala; Ellen T. Dec

[57] ABSTRACT

Aqueous slurries or dispersions of starch are reacted with N,N'-disubstituted imidazolium salts under controlled conditions to yield starch esters. The starch ester derivatives can also be prepared by a reaction in non-aqueous solvents.

7 Claims, No Drawings

PREPARATION OF STARCH ESTERS

BACKGROUND OF THE INVENTION

This invention relates to a novel process for the preparation of starch esters. More particularly, the present invention relates to the preparation of such esters by reacting starch under controlled conditions with a selected N,N'-disubstituted imidazolium salt.

The modification of starch by chemical derivatization and in particular the preparation of starch esters is well known in the art. An excellent review of the preparation of starch esters up to 1968 may be found in *Starch and Its Derivatives*, Chapter 12, J. A. Radley, Chapman and Hall, Ltd. The preparation of starch esters utilizing reactions of starch with imidazolides of carboxylic or sulfonic acids, is described in U.S. Pat. No. 3,720,663 issued Mar. 13, 1973 reissued as U.S. Pat. No. Re. 28,809. However, the prior art does not teach the preparation of starch esters or other starch derivatives using the reagent compounds of the present invention.

SUMMARY OF THE INVENTION

It is the principal object of this invention to provide a novel process for the preparation of starch esters.

A further object of this invention is to prepare starch esters, i.e. starch esters of monocarboxylic acids or starch esters, of polycarboxylic acids.

Another object of the invention is to provide a convenient and economical new reaction for chemically altering the paste properties of starch by a reaction of starch and a reagent selected from the class of N,N'-disubstituted imidazolium salts which reaction proceeds rapidly and efficiently.

According to the present invention, starch (or a starch derivative containing reactive hydroxyl groups) is reacted in an aqueous slurry, or a non-aqueous solvent, or in an aqueous dispersion under controlled conditions with a reagent selected within the class of N'-alkyl or N'-alkenyl imidazolium salts which themselves contain N-acyl, or N-alkylsulfonyl, or N-arylsulfonyl substituent groups.

The starch bases which may be used in preparing the starch esters according to this invention may be derived from any plant source including corn, potato, sweet potato, wheat, rice, sago, tapioca, waxy maize, sorghum, high amylose corn, or the like. Also included are the conversion products derived from any of the starch bases including, for example, dextrins prepared by the hydrolytic action of acid and/or heat, oxidized starches prepared by treatment with oxidants such as sodium hypochlorite; and fluidity or thin boiling starches prepared by enzyme conversion or by mild acid hydrolysis, as well as derivatized starches such as starch ethers and esters. The term "starch base" is thus seen to include any amylaceous substances, whether treated or chemically modified, which, however, still retain free hydroxyl groups capable of entering into the reaction with the reagent compounds described herein. If the desired starch ester is to be a granular starch obviously the initial starting base must be in granular form. It is noted, however, that the method of this invention may also be carried out employing gelatinized starches which will result in the production of non-granular starch ester products.

For purposes of this invention the term "N,N'-disubstituted imidazolium salts", the reagents useful herein, means compounds corresponding to the general formulas:

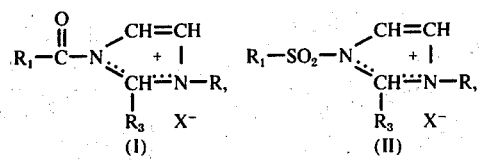

and

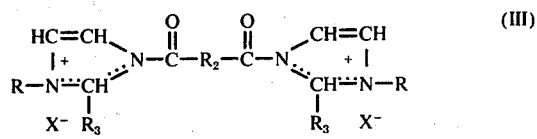

wherein R is selected from the group consisting of lower alkyl ($C_1 - C_4$) and lower alkenyl ($C_2 - C_4$); $R_1$ is selected from the group consisting of alkyl, substituted alkyl, alkenyl, cycloalkyl, aryl, substituted aryl, and arylalkyl; and $R_2$ is selected from the group consisting of alkylene, substituted alkylene, bis-alkylene ether, cycloalkylene, arylene and substituted arylene; and $R_3$ is selected from the group consisting of lower alkyl ($C_1 - C_4$) or H. $R_1$ and $R_2$ may each contain between 1 and 20 carbon atoms. X is $Br^-$ or $C^-$. These structures indicate the positive charge is distributed over the two nitrogen and one carbon atoms in the ring.

Suitable reagents as described by the above formulas may be prepared using acid chlorides of carboxylic or sulfonic acids such, for example, as the acid chloride of acetic acid, propionic acid, trimethylacetic acid, trichloroacetic acid, palmitic acid, stearic acid, phenylacetic acid, benzoic acid, cinnamic acid, succinic acid, p-bromobenzoic acid, p-methoxybenzoic acid, methanesulfonic acid, p-toluenesulfonic acid, fumaric acid, p-toluic acid, glutaric acid, adipic acid, sebacic acid, dimethylmalonic acid, terephthalic acid, diglycolic acid, 3,3'-oxydipropionic acid, benzenensulfonic acid, 1-naphthoic acid, cyclohexane carboxylic acid, and oleic acid.

The preparation of the N,N'-disubstituted imidazolium salts is described in the literature and is ordinarily carried out by reacting selected acid chlorides of carboxylic or sulfonic acids such as those listed above with N-alkyl or N-alkenyl imidazoles.

A discussion of preparing the reagent 1-acetyl-3-methyl imidazolium chloride is given by R. Wolferden and W. P. Jencks found at J.A.C.S. 83, 4390 (1961).

The novel process of this invention comprises reacting the selected imidazolium salt as described above with a starch base which is ordinarily suspended in water. The reaction is carried out at temperatures of from about 5° to 55° C. and preferably at 20° to 35° C. The pH of the reaction mixture is usually controlled so as to be above 5.0 and below 12.5, with the preferred pH range being from about 7.0 to 9.0. The skilled practitioner will recognize that certain starch esters are readily hydrolyzed at high pH, and therefore must be prepared at a pH at which they are stable. The pH is conveniently controlled by the periodic addition of a dilute aqueous solution of sodium hydroxide but other common bases, such as calcium or potassium hydroxide, tertramethylammonium hydroxide and sodium carbonate, may also be used with equal success.

In one variation of the described method, the pH of the reaction mixture is not controlled. In this variation an excess of base is added to the system, which results in a pH in the range of 11.0 – 12.5, with the imidazolium salt being added and the reaction mixture neutralized thereafter.

The amount of imidazolium salt used to react with the starch base may vary from about 0.10 to 100 percent, based on the weight of dry starch, depending on such factors as the starch base employed, the degree of stabilization or cross-linking which is desired in the end product, and the particular imidazolium salt reagent. The preferred amount of imidazolium salt employed ranges from about 5 – 30 percent if a stabilized product is desired, i.e. reaction of starch with an imidazolium salt of a monocarboxylic acid. If a cross-linked starch product is desired, the preferred amount of an imidazolium salt of a polycarboxylic acid is from about 0.4 – 5.0 percent.

Reaction time will vary from about 10 minutes to about 20 hours depending on such factors as the reactivity of the reagent used, the amount of reagent used, the temperature employed, etc. After completion of the reaction, the pH of the reaction mixture is preferably adjusted to a pH of from about 5.0 to about 7.0 with any common acid such as hydrochloric acid, sulfuric acid, acetic acid, or the like, or common base such as dilute sodium hydroxide. The pH of the reaction will determine if acid or base is required. The resultant starch product, if in granular form, is then recovered by filtration, washed free of residual salts with water, and dried. Alternatively, the washed product may be drum dried or spray dried, or gelatinized and isolated by alcohol precipitation or freeze drying. If the product is non-granular, it can be purified by dialysis and isolated by alcohol precipitation or freeze drying.

While aqueous suspensions are preferred, the reaction may be carried out, if desired, in a non-aqueous system by suspending the starch base in any common organic solvent as, for example, toluene, p-dioxane, dichloromethane, and the like, and then adding the imidazolium salt. The reaction in organic solvent is usually carried out at temperatures of from about 20° to 150° C. for periods of about 1 to 12 hours. The resultant starch product is isolated by filtration. If removal of salts or organic by-products is desired, the product can be purified as described above with reference to the aqueous reaction products.

It is to be noted that a large number of variations may be effected in reacting the starch base with the N,N'-disubstituted imidazolium salts in accordance with the procedures described above without materially departing from the spirit of the invention. Such variations will be evident to those skilled in the art.

The starch products resulting from the practice of this invention are starch esters with the general reactions employing the substituted imidazolium salts of structures I, II and III being represented as follows:

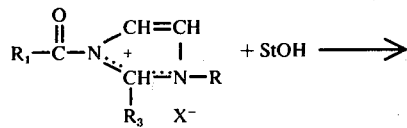

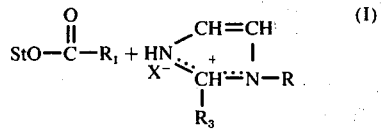

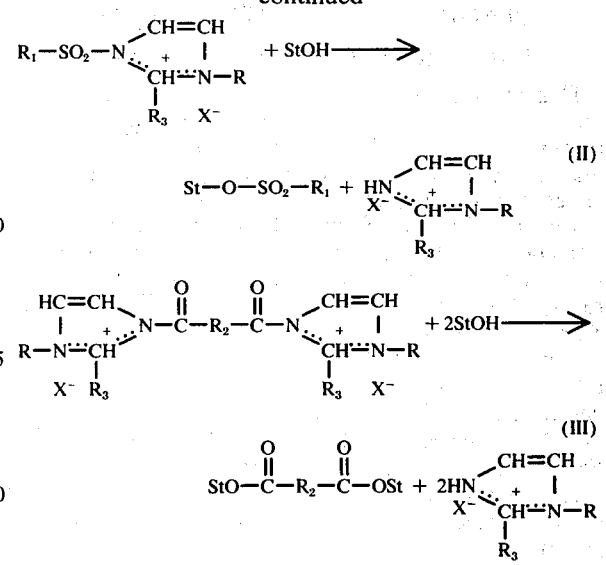

wherein StOH represents the starch molecule and R, $R_1$, $R_2$, and $R_3$ are as defined hereinabove. These are schematic equations which describe the chemical changes occurring during the reaction. The practitioner will recognize that the starch molecule is a polymer of glucose and contains three free hydroxyl groups per anhydroglucose unit in the polymer. (The non-reducing end glucose units contain four free hydroxyl groups.) Each of these hydroxyl groups can react as described in these equations. It is also known that the relative reactivity of each of the hydroxyl groups is not equivalent, some being more reactive than others, and that many hydroxyl groups from the same starch molecule will react to give the products of this invention.

The starch products formed in equations (I) and (II) are stabilized starch esters while the starch products (granular) formed in equation (III) are inhibited (crosslinked) to varying degrees depending largely on the extent of the reaction and the consequent number of crosslinkages.The amount of granule inhibition may be determined by performing a sediment volume test. In this procedure, an aqueous suspension of the inhibited product having a concentration of 1 percent solids, by weight, is cooked on a boiling water bath for about 30 minutes. The resulting dispersion is then allowed to stand in a graduated vessel, such as a 100 ml graduated cylinder, at room temperature for a period of about 16 hours. The cooked product will separate into layers on the basis of relative inhibition. In extreme cases it will completely settle out with the sediment so formed occupying different volumes depending on the degree of inhibition of the reaction product. These sediments are composed of insoluble granules of the starch derivative whose swollen volumes are relative to the degree of inhibition of the derivatives. Thus, because of their lower swelling and hydration capacity, the more inhibited, i.e., the more crosslinked products will yield smaller sediment volumes than correspondingly less inhibited products. Where, however, the original starch base exhibits no sediment formation because of the completely swollen highly hydrated and/or disrupted nature of its granules, e.g., in the case of waxy maize starch, inhibition in the product will be evidenced by the subsequent formation of sediment. The result is directly attributable to the toughened state of the crosslinked granules.

The crosslinked products of this invention, because of their unique combination of properties, can be utilized in many applications. Thus, in the food industry, they can be used as thickening agents for pies, sauces, soups, etc. They are particularly of interest in the canning industry as a result of their unique behavior during retorting of the canned food products. In the retorting process the crosslinkages of the inhibited starch products of this invention are initially intact and the starch dispersion is in a thin state, thereby enabling the heat utilized for sterilizing the food product to penetrate the can and its contents rapidly. As the heating is continued, however, the crosslinkages of the inhibited starch thickeners are destroyed thereby activating their delayed thickening properties to produce desirable high viscosity dispersions. In addition, these novel starch products may be used as dusting powders for surgical and cosmetic purposes, etc.

The stabilized cereal starch ester products of the invention formed in equations (I) and (II) are characterized by the stability of their dispersions. Thus, the cooked pastes derived from the water dispersible form of these esters display improved clarity and resistance to gelling on cooling. This highly desired property permits these derivatives of this invention to be widely utilized as, for example, in the sizing of paper and textiles, and in foods. Another characteristic of the starch products of this invention is lowered gelatinization temperature as compared to untreated starch. This is of importance in many industrial processes (particularly in food manufacture), since it permits operation at lower temperatures.

The following examples will illustrate the practice of this invention but are not intended to limit its scope. In these examples, all parts given are by weight unless otherwise noted.

EXAMPLE I

This example illustrates the use of various N,N'-disubstituted methylimidazolium chlorides in preparing starch esters according to the process of this invention utilizing an aqueous reaction. The resultant starch esters are not crosslinked and display an intact granule structure.

In preparing the starch derivatives listed in Table I, 1.00 parts starch (as identified in Table I) was suspended in 1.25 to 1.50 parts water, and the selected N,N'-disubstituted methylimidazolium chloride added slowly while the pH was controlled at the indicated value by periodic addition of 3.0 % aqueous sodium hydroxide during the course of the reaction. The reaction was allowed to proceed at the indicated temperature until there was no further change in pH. The resulting starch ester derivatives were then acidified with dilute hydrochloric acid to pH 5.0, recovered by filtration, washed three times with water, and dried. The acyl or methylsulfonyl content of each starch ester was calculated from its saponification number (see Table I).

TABLE I

| Derivative No. | Base Starch | Esterification Reagent* | Wt. % on Starch | pH | Temp. | Time | % Acyl |
|---|---|---|---|---|---|---|---|
| 1 | corn | A | 7.5 | 5.0 | RT | 20 min. | 0.10 |
| 2 | " | A | 7.5 | 7.0 | RT | 15 min. | 0.56 |
| 3 | " | A | 7.5 | 8.0 | RT | 15 min. | 1.00 |
| 4 | " | A | 7.5 | 9.0 | RT | 35 min. | 0.62 |
| 5 | " | B | 10.0 | 8.0 | RT | 45 min. | 0.28** |
| 6 | " | B | 5.0 | 9.5 | RT | 15 min. | 0.24** |
| 7 | " | C | 12.0 | 8.0 | RT | 15 min. | 1.81 |
| 8 | " | C | 6.0 | 8.0 | 5° C. | 40 min. | 0.83 |
| 9 | " | C | 6.0 | 8.0 | 45° C. | 20 min. | 0.80 |
| 10 | potato | C | 6.7 | 8.0 | RT | 15 min. | 0.33 |
| 11 | oxidized corn starch, 75 fluidity | C | 6.7 | 8.0 | RT | 15 min. | 0.69 |
| 12 | high amylose corn starch (70% amylose by wt.) reacted with 10.0% propylene oxide and 0.013% epichlorohydrin | C | 6.7 | 8.0 | RT | 15 min. | 0.64 |
| 13 | corn | D | 15.0 | 8.0 | RT | 40 min. | 4.12 |
| 14 | corn | E | 10.0 | 8.0 | RT | 35 min. | 2.50 |
| 15 | corn starch reacted with 3% diethylaminoethyl chloride hydrochloride | F | 10.0 | 8.0 | RT | 16 hours | 3.33 |
| 16 | corn starch reacted with 3% diethylaminoethyl chloride hydrochloride | G | 10.0 | 8.0 | RT | 18 hours | 1.21 |

*A = N-acetyl-N'-methylimidazolium chloride
B = N-methylsulfonyl-N'-methylimidazolium chloride
C = N-benzoyl-N'-methylimidazolium chloride
D = N-palmitoyl-N'-methylimidazolium chloride
E = N-cinnamoyl-N'-methylimidazolium chloride
F = N-stearoyl-N'-methylimidazolium chloride
G = N-oleoyl-N'-methylimidazolium chloride
**% methylsulfonyl

EXAMPLE II

This example illustrates the preparation of starch ester products according to the method of this invention utilizing a non-aqueous solvent system.

A total of 30 parts corn starch was suspended in 100 parts dichloromethane and 6 parts N-benzoyl-N'-methylimidazolium chloride was added. The mixture was stirred at room temperature for five hours, filtered, washed three times with water, and dried. The starch product was found to contain 0.47% benzoyl groups, by weight.

The above reaction was repeated except that toluene was used in place of the dichloromethane and the reaction temperature was 110° C. (refluxing toluene). The starch product was found to contain 0.44% benzoyl groups, by weight.

EXAMPLE III

This example illustrates the preparation of a non-granular starch product prepared by using a previously gelatinized starch base in the process of this invention.

A total of 35 parts of an acid hydrolyzed waxy maize (85 fluidity) was suspended in 140 parts water. The suspension was heated on a boiling water bath for 15 minutes and then cooled to about room temperature, and the pH of the thus-gelatinized starch was adjusted to 8.0 with dilute sodium hydroxide. A total of 21 parts N-benzoyl-N'-methylimidazolium chloride was slowly added over a period of 45 minutes while controlling the pH at 8.0 by the periodic addition of 3% aqueous sodium hydroxide. The starch dispersion was then stirred for 5 hours at controlled pH 8.0 and room temperature. During the reaction, the starch product became water-insoluble. The pH was lowered to 5.0 with 10% hydrochloric acid, the water decanted, and the starch added to a large volume of ethyl alcohol with agitation in a Waring blender. The starch was isolated by filtration and air dried. The starch product was found to contain 10.5% benzoyl groups, by weight.

EXAMPLE IV

This example illustrates the preparation of starch ester products according to this invention in the presence of excess alkali.

A total of 50 parts waxy maize was added to a solution of 1.5 parts sodium hydroxide and 15.0 parts sodium sulfate in 105 parts water. The pH of the resulting slurry was 12.5. A total of 2.5 parts N-(p-toluenesulfonyl)-N'-methylimidazolium chloride was rapidly added and the mixture stirred at room temperature for 10 minutes. The pH decreased to 11.9. The pH was then lowered to 5.0, the starch isolated by filtration, washed with water and ethanol and dried. The resulting starch product contained 0.58% p-toluenesulfonyl groups, by weight.

EXAMPLE V

This example illustrates the preparation of cross-linked starches according to this invention.

In preparing these derivatives, listed in Table II, 100 parts of waxy maize starch was suspended in 150 parts water whereupon the indicated amount of N-methylimidazolium chloride derivative of a polycarboxylic acid was added to the suspension. The pH was controlled at 8.0 by the periodic addition of 3.0% aqueous sodium hydroxide solution during the course of the reaction. The reaction was allowed to proceed at room temperature until there was no further change in pH and then stirring was continued for about an additional 20 minutes. Most of the reactions were completed in about one hour. The resulting starch ester derivatives were then acidified with dilute sulfuric acid to pH 5.0, recovered by filtration, washed with water to remove residual salts, and dried.

The degree of inhibition was determined by cooking an aqueous suspension of the resulting starch product having a concentration of 1%, by weight (dry basis) solids at pH 7.0 in a boiling water bath for a period of 30 minutes. The cooked dispersion was then allowed to stand at room temperature for a period of approximately 16 hours in a 100 ml graduated cylinder. In order to show comparative values, the sediment volume of the base starch was also determined by this method. The resulting sediment volumes are tabulated in Table II.

TABLE II

| Derivative No. | Base Starch | Esterification Reagent* | Wt. % on Starch | Sediment Volume (ml.) | |
|---|---|---|---|---|---|
| | | | | Rx Product | Base Starch |
| 1 | Waxy maize | A | 3.0 | 10.2 | 0 |
| 2 | " | B | 0.5 | 30.9 | 0 |
| 3 | " | B | 1.5 | 20.1 | 0 |
| 4 | " | C | 2.0 | 10.4 | 0 |
| 5 | " | D | 4.0 | 70.1 | 0 |

*The esterification agent was prepared using the identified acids:
A = adipic acid
B = succinic acid
C = sebacic acid
D = fumaric acid

EXAMPLE VI

This example illustrates the use of varied N,N'-disubstituted imidazolium salts in preparing the starch ester products according to this invention.

In preparing the starch esters listed in Table III, 100 parts corn starch was suspended in 125 parts water, and the pH was raised to 8.0 with 3.0% aqueous sodium hydroxide. The indicated amount of the reaction product of p-toluenesulfonyl chloride and various substituted imidazoles as indicated in Table III was then added. The resulting slurry was stirred at room temperature (about 22° C.) for the indicated period of time while controlling the pH at 8.0 with 3% aqueous sodium hydroxide as required. The pH was then lowered to 5.0, the starch recovered by filtration, washed three times with water and dried. The p-toluenesulfonyl content of each reacted starch product was calculated from the saponification number.

TABLE III

| Derivative No. | Esterification Reagent* | Wt. % on Starch | Time | % p-toluene-sulfonyl |
|---|---|---|---|---|
| 1 | N-allylimidazole | 16.7 | 4 hrs. | 2.24 |
| 2 | N-propylimidazole | 27.2 | 7 hrs. | 2.48 |
| 3 | N-methylimidazole | 21.4 | 18 hrs. | 3.65 |
| 4 | 1,2-dimethylimidazole | 11.7 | 4 hrs. | 3.04 |
| 5 | N-vinylimidazole | 10.4 | 16 hrs. | 1.09 |
| 6 | N-methylimidazole | 7.5 | 4 hrs. | 1.54 |

*The esterification reagent used was the N-(p-toluenesulfonyl)-chloride derivative of the indicated substituted imidazole.

Variations may be made in materials, proportions and procedures without departing from the scope of this invention.

I claim:

1. A process for preparing esters of a starch having free reactive hydroxyl groups comprising the steps of:
   a. reacting said starch with a N,N'-disubstituted imidazolium salt selected from the group consisting of

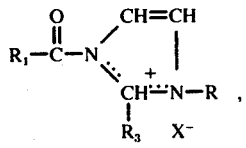

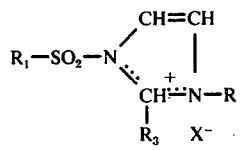

and

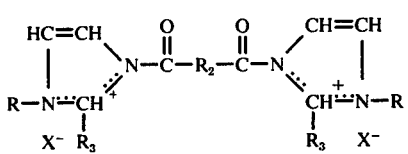

wherein R is selected from the group consisting of lower alkyl ($C_1$–$C_4$) and lower alkenyl ($C_2$–$C_4$); $R_1$ is selected from the group consisting of alkyl, substituted alkyl, alkenyl, cycloalkyl, aryl, substituted aryl, and arylalkyl; $R_2$ is selected from the group consisting of alkylene, substituted alkylene, bisalkylene ether, cycloalkylene, arylene and substituted arylene; and $R_3$ is selected from the group consisting of lower alkyl or H; $R_1$ and $R_2$ may each contain between 1 and 20 carbons; and X is $Br^-$ or $Cl^-$; wherein the reaction with the starch is conducted in an aqueous medium at a pH level of from about 5.0 to 12.5 at temperatures of from 5° to 55° C. for a period of from about 10 minutes to 20 hours, employing the N,N'-disubstituted imidazolium salt in an amount of 0.10 to 100 percent on the weight of dry starch; and
   b. isolating the resultant starch derivative.

2. A process according to claim 1 wherein said starch is selected from the group consisting of corn, waxy maize, and potato starch.

3. A process according to claim 1 wherein the amount of N,N'-disubstituted imidazolium salt is from 5 to 30 percent on the weight of the dry starch and the pH level is maintained at from 7 to 9.

4. A process according to claim 1 wherein said N,N'-disubstituted imidazolium salt is selected from the group consisting of N-(p-toluenesulfonyl)-N'-methylimidazolium chloride, N-benzoyl-N'-methylimidazolium chloride, N-oleoyl-N'-methylimidazolium chloride, N-stearoyl-N'-methylimidazolium chloride, and N-palmitoyl-N'-methylimidazolium chloride.

5. A process for preparing esters of a starch having free reactive hydroxy groups comprising the steps of:
   a. reacting said starch with a N,N'-disubstituted imidazolium salt selected from the group consisting of

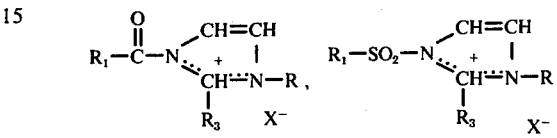

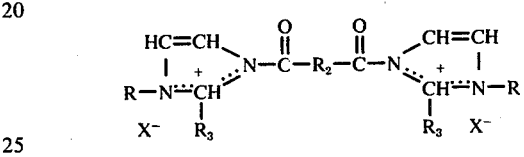

wherein R is selected from the group consisting of lower alkyl ($C_1$–$C_4$) and lower alkenyl ($C_2$–$C_4$); $R_1$ is selected from the group consisting of alkyl, substituted alkyl, alkenyl, cycloalkyl, aryl, substituted aryl, and arylalkyl; $R_2$ is selected from the group consisting of alkylene, substituted alkylene, bisalkylene ether, cycloalkylene, arylene and substituted arylene; and $R_3$ is selected from the group consisting of lower alkyl or H; $R_1$ and $R_2$ may each contain between 1 and 20 carbons; and X is $Br^-$ or $Cl^-$; wherein the reaction is carried out in a non-aqueous liquid medium, at temperatures of from 20° to 150° C. for a period of from about 1 to 12 hours, employing the N,N'-disubstituted imidazolium salt in an amount of from 0.10 to 100 percent on the weight of dry starch; and
   b. isolating the resultant starch derivative.

6. A process according to claim 5 wherein said starch is selected from the group consisting of corn, waxy maize, and potato starch.

7. A process according to claim 5 wherein said N,N'-disubstituted imidazolium salt is selected from the group consisting of N-(p-toluenesulfonyl)-N'-methylimidazolium chloride, N-benzoyl-N'-methylimidazolium chloride, N-oleolyl-N'-methylimidazolium chloride, N-stearoyl-N'-methylimidazolium chloride, and N-palmitoyl-N'-methylimidazolium chloride.

* * * * *